(12) United States Patent
Greenwood et al.

(10) Patent No.: US 8,744,162 B2
(45) Date of Patent: Jun. 3, 2014

(54) IMAGE EVALUATION METHOD AND SYSTEM

(75) Inventors: Mark Greenwood, Granite Bay, CA (US); Edwin McDonough, Long Grove, IL (US); Bradley McDougall, Buffalo Grove, IL (US); Don Walker, Mundelein, IL (US)

(73) Assignee: Midmark Corporation, Versailles, OH (US)

( * ) Notice: Subject to any disclaimer, the term of this patent is extended or adjusted under 35 U.S.C. 154(b) by 94 days.

(21) Appl. No.: 13/428,511

(22) Filed: Mar. 23, 2012

(65) Prior Publication Data

US 2012/0243766 A1    Sep. 27, 2012

Related U.S. Application Data (60) Provisional application No. 61/467,617, filed on Mar. 25, 2011.

(51) Int. Cl.
*G06K 9/00* (2006.01)
*A61B 6/14* (2006.01)
*A61C 19/04* (2006.01)

(52) U.S. Cl.
USPC ............................. 382/132; 378/38; 433/68

(58) Field of Classification Search
USPC ......... 382/128, 129, 130, 131, 132, 133, 134; 378/4, 7, 21–27, 101, 140, 901, 38, 62, 378/90, 92, 98.9, 168, 191; 433/68, 19, 24, 433/70, 196; 128/920, 922
See application file for complete search history.

(56) References Cited

U.S. PATENT DOCUMENTS

| | | | |
|---|---|---|---|
| 5,915,961 A * | 6/1999 | Kooiman | 433/5 |
| 7,929,661 B2 * | 4/2011 | Borghese et al. | 378/38 |
| 2011/0110496 A1 * | 5/2011 | Foos et al. | 378/98.5 |

* cited by examiner

*Primary Examiner* — Abolfazl Tabatabai
(74) *Attorney, Agent, or Firm* — Wood, Herron & Evans, LLP (57) ABSTRACT

A method and system for evaluating images, such as x-ray image, to provide feedback that can be used for subsequent image acquisition. The feedback may be used to adjust the positioning of a patient with respect to an image capture device, or a setting of the image capture device. The image capture device may be part of a dental x-ray imaging system that generates an x-ray image of the patent and provides the image to a collector service. The image is evaluated by the collector service for positioning errors and other operator correctable issues that may have had an impact on the image quality. A report that includes feedback regarding the operator correctable issues, as well as suggested corrective action, is generated and provided to the imaging system operator.

19 Claims, 6 Drawing Sheets

IMAGE EVALUATION METHOD AND SYSTEM

CROSS-REFERENCE TO RELATED APPLICATIONS

This application claims the filing benefit of U.S. Provisional Patent Application Ser. No. 61/467,617 filed on Mar. 25, 2011 (pending), which is incorporated by reference herein in its entirety.

TECHNICAL FIELD

The present invention relates generally to image evaluation, and more particularly to the evaluation of dental x-ray images to provide feedback to a dental x-ray system operator.

BACKGROUND

Dental x-ray images are taken routinely as part of a normal dental exam to provide the dentist with information relating to the internal structure of a patient's teeth, jaw bones, and surrounding soft tissues. Dental x-rays can reveal cavities and other hidden dental problems, such as impacted teeth, that are not easily diagnosed by a simple visual examination of the patient's mouth. Dental x-rays may also be obtained during follow-up exams to determine the effectiveness of previous dental treatments and otherwise determine the health of the patient's teeth.

One type of dental x-ray machine is a panoramic imager. A panoramic imager typically includes an x-ray source and an imaging device that are maintained in an opposing relationship by a rotating arm. The x-ray source and imaging device are spaced sufficiently apart horizontally by the rotating arm to allow a patient's head to be positioned between the x-ray source and imaging device. When the x-ray source is activated, electromagnetic radiation penetrates the patient's head and excites the imaging device, thereby producing an image that corresponds to the density of the bone and tissue matter in the path between the x-ray source and the imaging device. To generate a panoramic image, the arm is rotated about the patient's head while the imaging device captures multiple x-ray images from different angles. These images are then processed to produce a single panoramic image of the patient's teeth and jaw.

In order to minimize distortion and blurring of the panoramic image, the movement of the rotating arm is designed to: (1) maintain a constant distance between the patient's teeth, the imaging device, and x-ray source while the arm is rotated, and (2) maintain the axis connecting the x-ray source and imaging device in an orthogonal orientation with respect to the patient's dental arch. However, because anatomy varies from patient to patient, the movement of the rotating arm is generally a compromise that provides acceptable results over a normal range of patient sizes and shapes. Because of the sensitivity of image quality to the distances and angles between the patient's head and the x-ray imaging components, obtaining clear images requires that the patient be properly positioned within the machine. A patient that is not properly positioned will result in inconsistent distances and angles between the patient's teeth, the x-ray source, and the imaging device as the arm is rotated. As a result, a patient that is even slightly out of position will typically produce images that are blurry and distorted. A dental panoramic imager operator may not be aware of the specific problem causing the poor image quality, resulting in the operator taking multiple images before obtaining a satisfactory result. Thus, an out of position patient may result in wasted time and effort, as well as additional unneeded exposure to x-ray radiation.

Therefore, there is a need for methods and systems of providing feedback to panoramic imager operators and other medial imaging system operators to improve the imaging process.

SUMMARY

The present invention provides a method and system for evaluating images, such as a panoramic dental x-ray image, to provide feedback that can be used to make adjustments to equipment settings and/or patient positioning for subsequent image acquisition. More specifically, the feedback may be used to correct operator correctable issues, such as by adjusting the positioning of a patient within a dental panoramic imager, which may include an x-ray imaging system.

The present invention is directed to a system that is able to evaluate x-ray images, such as a panoramic x-ray, or PAN image. The x-ray images are acquired and evaluated to determine whether the x-ray image was taken correctly. The result of the evaluation can include a report with feedback for improving future x-ray image acquisition. For example, it may be advantageous to provide feedback to indicate whether the head positioning of the patient in the x-ray image is off, whether the air passage of the patient is closed, whether there are artifacts in the image (such as would be caused by a lead apron or jewelry), whether the x-ray power and frequency are set optimally for the patient size/age/density, and/or additional notes related to the x-ray image. The x-ray image may be evaluated by an image evaluator who provides the feedback using an image evaluation application, or the x-ray image may be evaluated by an algorithm executed by a computing system that provides the feedback. The feedback may automatically populate a report which is provided to the facility that took the x-ray image. The facility thus has an indication of potential adjustments that can be made with respect to subsequent x-ray image acquisition to acquire a higher fidelity x-ray image.

DETAILED DESCRIPTION

Figure 1:
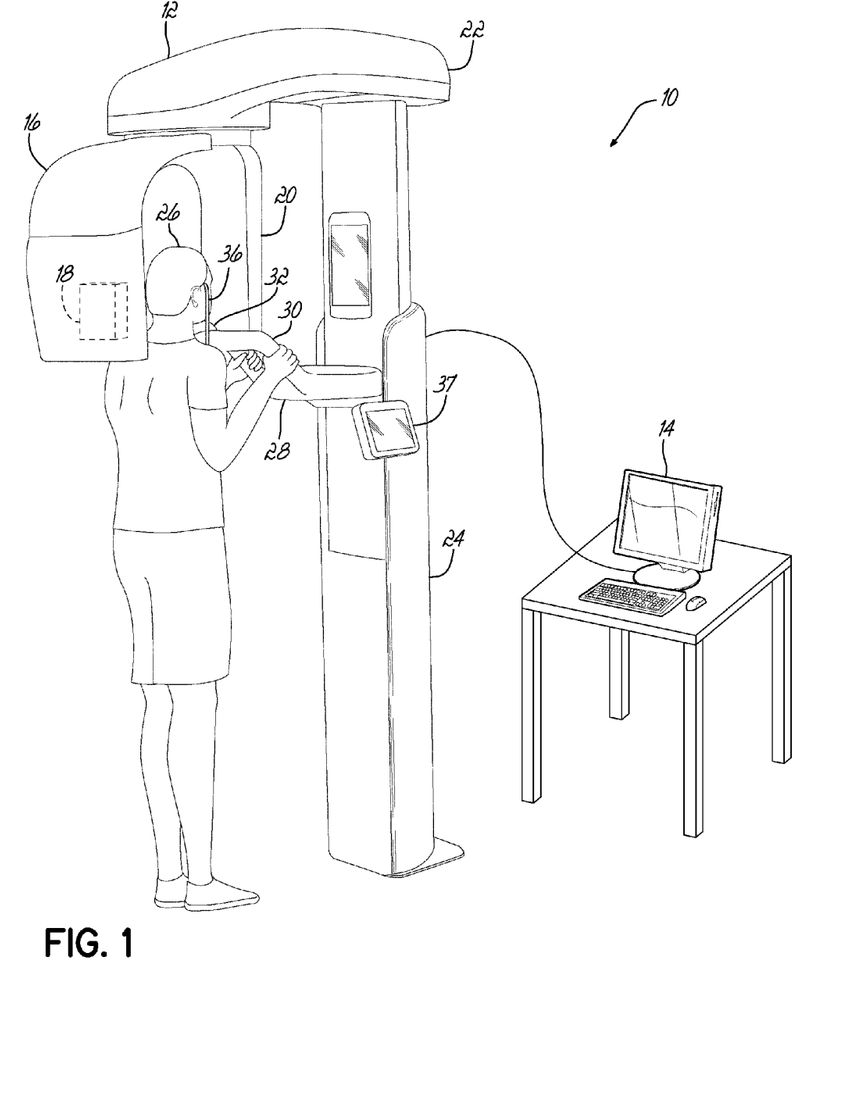
FIG. 1 illustrates an exemplary panoramic imager and workstation configuration.
Figure 1A:
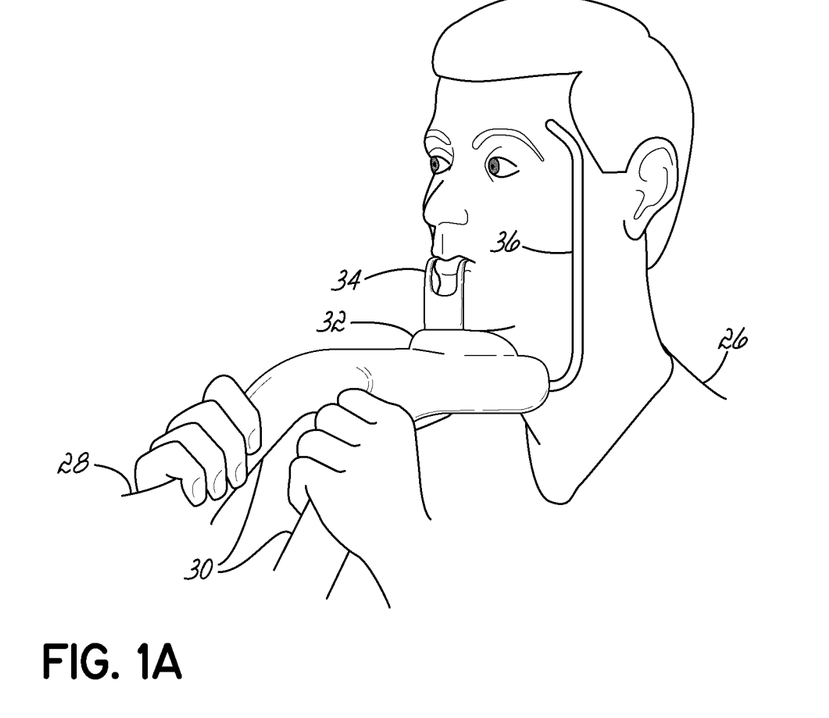
FIG. 1A illustrates a patent's head positioned in the panoramic imager with positioning aids.

Referring now to FIGS. 1 and 1A, an imaging system 10 includes an image capture device 12 that is operatively coupled to a workstation 14. In an embodiment of the invention, the image capture device 12 may be a panoramic imager, such as a VANTAGE® Dental X-Ray available from PROGENY® of Linconshire, Ill.; and the workstation 14 may be a dedicated PC workstation running imaging software, such as Progeny Imaging software also available from PROGENY® of Linconshire, Ill. In the exemplary embodiment illustrated by FIGS. 1 and 1A, the image capture device 12 is a panoramic imager that includes a rotating arm 16. The rotating arm 16 includes an x-ray source 18 and an x-ray sensor 20, and is rotatably coupled to an upper support member 22. The upper support member 22 extends vertically from a base member 24 that provides a height adjustment mechanism for upper support member 22 which allows the rotating arm 16 to be positioned at a proper level for a patient 26. The upper support member 22 also includes a support arm 28 that extends generally toward the patient 26. The support arm 28 may include handles 30, a chin rest 32, a bite guide 34, and temple positioning wands 36 to facilitate positioning of the patient 26 within the rotating arm 16. The panoramic imager 12 may also include a control panel 37 and alignment lasers (not shown), such as a mid-Saggital laser, a Frankfort Plane laser, and/or a cuspid laser that project reference lines to further assist the system operator in properly positioning the patient's head.

During an examination, the patient 26 stands so that their head is positioned within the rotating arm 16. To properly position the patient's head, the patient holds on to the handles 30, places their chin on the chin rest 32, and bites down on the bite guide 34. The system operator may then close the positioning wands 36, fine tune the height of the rotating arm 16, and further adjust the position of the patient's head using the aforementioned laser markers as a guide. Once the patient 26 is positioned, the operator may activate the image capture device 12 either directly using the control panel 37 or by entering a command into the workstation 14. In response, the image capture device 12 activates the x-ray source 18 and x-ray sensor 20. The rotating arm 16 rotates about the patient's head in a pre-programmed manner so that the x-ray sensor 20 captures x-ray images of the patient's head and mouth from multiple angles. The images generated by the image capture device 12 are provided to the workstation 14, which may generate a panoramic image based thereon.

Figure 2:
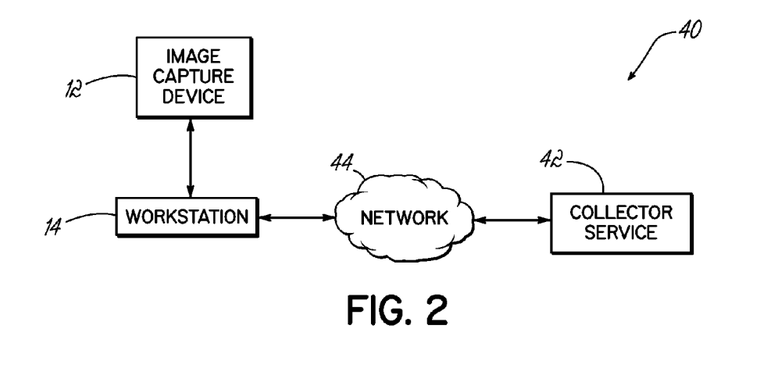
FIG. 2 is a schematic diagram illustrating a system for capturing, transferring, and evaluating images generated by the panoramic imager and workstation in FIG. 1.

Referring now to FIG. 2, a diagrammatic illustration of an exemplary image evaluation system 40 consistent with embodiments of the invention is presented. The system 40 includes the image capture device 12, which is configured to acquire an x-ray image, such as a PAN image, and provide the image to the workstation 14 as described previously with respect to FIG. 1. The workstation 14 may be configured to filter (e.g., to clarify, smooth, or otherwise alter the image), compress, encrypt and/or otherwise process the x-ray image prior to transmission to a collector service 42 over a network 44. The network 44 will typically include one or more private networks (e.g., one or more intranets) and/or one or more public networks (e.g., the Internet). The collector service 42, in turn, is configured as a repository for the x-ray image. As such, the collector service 42 receives the x-ray image and decrypts, decompresses, indexes, and/or stores the x-ray image. In some embodiments, the workstation 14 may be the location at which the x-ray image is evaluated, while in other embodiments the collector service 42 may be the location at which the x-ray image is evaluated. In yet other embodiments, the workstation 14 and collector service 42 may be hosted on a single hardware platform that is co-located with, or integrated into, the image capture device 12.

In an embodiment of the invention, x-ray images are provided from the image capture device 12 to the workstation 14 via a network interface. A client application hosted by the workstation 14 establishes a connection with, and transmits image data to, a server application hosted by the collector service 42. In addition to the image or payload data, the transmitted data may include a header indicating the type of transmission (e.g., an image data or device data) and a practice name (e.g., a customer identity). The client application may then wait for a response from the server application before processing any more images. After the server application has received and/or processed the data, a response is sent back to the client application. The response may provide an indication that: (1) the data was received and processed successfully, (2) there was a failure in the transmission, in which case the client may re-send the data; or (3) the practice is not listed on the practice access list, in which case the client may provide an indication to the system operator that the system 10 is not registered.

Figure 3:
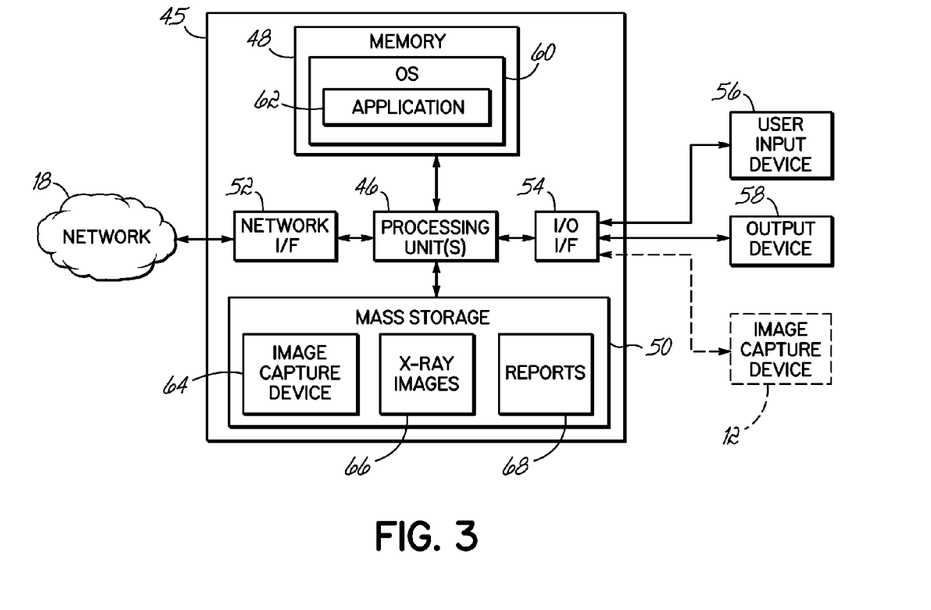
FIG. 3 is a schematic diagram illustrating additional details of the workstation and collector service platforms shown in FIG. 2.

Referring now to FIG. 3, a schematic diagram illustrates details of a hardware platform 45 that may be used to host the workstation 14 and/or collector service 42 consistent with embodiments of the invention. In general, the workstation 14 and collector service 16 are computing systems. The workstation 14 and/or collector service 42 thus includes at least one computer, computer system, computing device, server, disk array, or programmable device such as a multi-user computer, a single-user computer, a handheld device, a networked device (including a computer in a cluster configuration), etc. To this end, hardware platform 45 includes at least one processing unit 46 coupled to a memory 48. Each processing unit 46 is typically implemented in hardware using circuit logic disposed in one or more physical integrated circuit devices, or chips and may include one or more microprocessors, microcontrollers, field programmable gate arrays, or ASICS. Memory 48 may include random access memory (RAM), dynamic random access memory (DRAM), static random access memory (SRAM), flash memory, EEPROM and/or another digital storage medium, and is typically implemented using circuit logic disposed on one or more physical integrated circuit devices, or chips. As such, memory 48 may be considered to include memory storage physically located elsewhere in the hardware platform 45. For example, memory 48 may include any cache memory in the at least one processing unit 46, as well as any storage capacity used as a virtual memory, e.g., as stored on a mass storage device 50, a computer, or another controller coupled to the hardware platform 45 through a network interface 52 (illustrated as "Network I/F" 52) by way of the network 44.

The hardware platform 45 includes peripheral devices coupled through an input/output device interface 54 (illustrated as "I/O I/F" 54). As such, the hardware platform 45 is configured to receive data from a user through at least one user input device (including, for example, a keyboard, mouse, microphone, and/or other user input device) 56 and/or output data to a user through at least one output device (including, for example, a display, speakers, and/or another output device) 58. The device interface 54 may also communicate with a device that includes a user interface and at least one output device in combination, such as a touchscreen (not shown). As illustrated in FIG. 3, the hardware platform 45 that hosts the workstation 14 may also be directly connected to the image capture device through the device interface 54.

The hardware platform 45 may be under the control of an operating system 60 and executes or otherwise relies upon various computer software applications, components, programs, files, objects, modules, etc. (collectively referred to herein as "program code") resident in memory 48. The hardware platform 45 is also configured with one or more applications 62 that receive x-ray images, compress or decompress the x-ray images, encrypt or decrypt the x-ray images, send and/or receive data, that index and store the x-ray images, and that are used in the evaluation of the x-ray images. The mass storage device 50, in turn, may include an image capture device data structure 64 to store data associated with the image capture device 12, an x-ray images data structure 66 to store the x-ray images, and/or a reports data structure 68 to store reports and/or data associated therewith. Each data structure 64, 66, 68 may in turn include an array, a table, a file, a database, portion of the foregoing, or another data storage structure or portion thereof.

Figure 4:
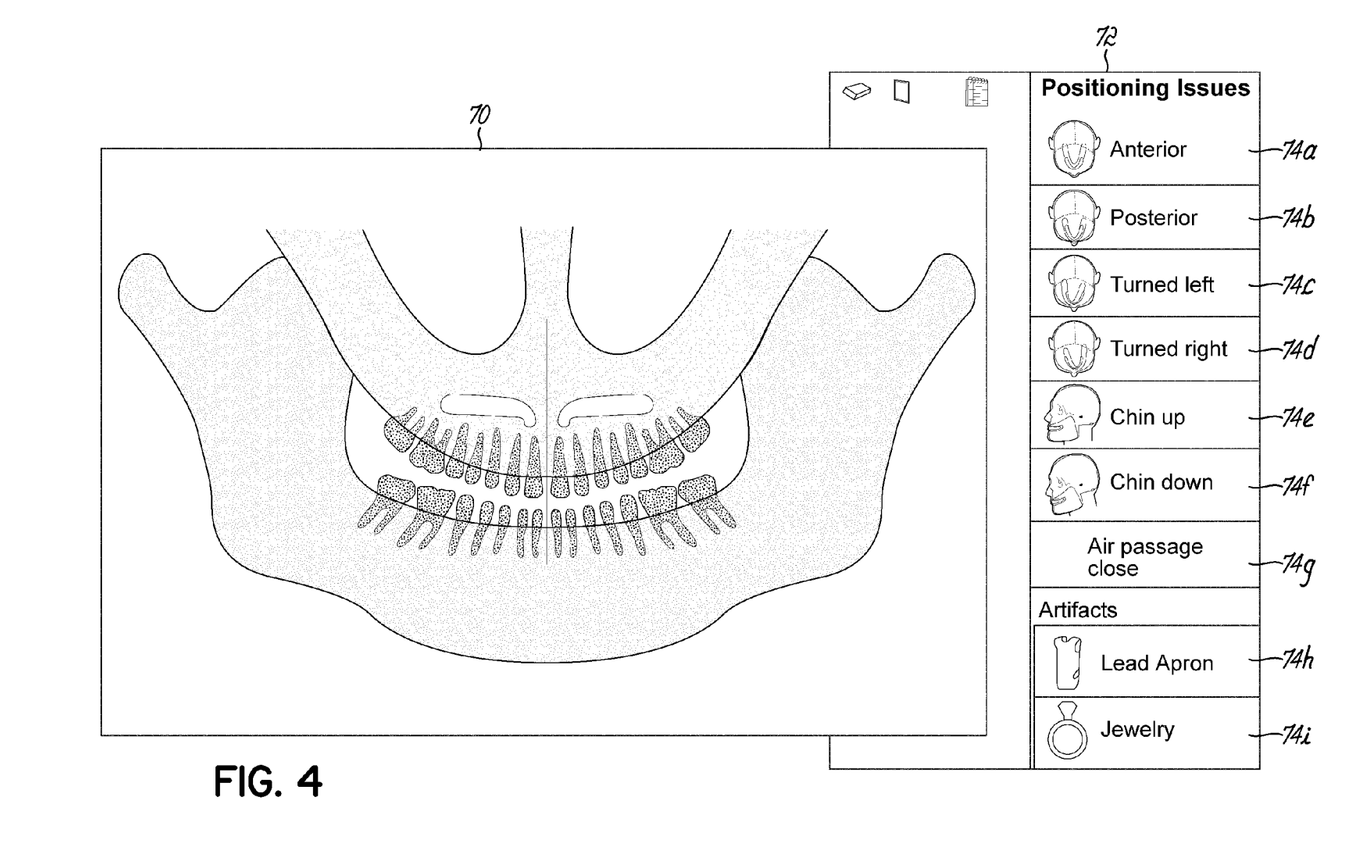
FIG. 4 illustrates an exemplary screen displayed to an image evaluator by an image evaluation application.

Referring now to FIG. 4, the application 62 running on the collector service 42 may be an image evaluation application used for evaluation of the x-ray images received from the workstation 14. To this end, the application 62 may display an x-ray image 70 and a report generation pane 72 that includes a plurality of image issue buttons 74a-74i, with each button being associated with a patient positioning error or other operator correctable issue. An image evaluator may evaluate the x-ray image 70 and, by activating one or more image issue buttons 74a-74i with the user input device 56, indicate whether there are poisoning and/or other operator correctable issues with the image 70. To this end, the report generation pane 72 may include an anterior positioning issue button 74a, a posterior positioning issue button 74b, buttons for indicating the patient's head is turned to the left 74c or right 74d, tilted up 74e or down 74f, and whether the air passage of the patient is closed 74g. The report generation pane 72 may also include buttons 74h, 74i that allow the image evaluator to indicate that there are artifacts in the x-ray image, such as might be caused by a poorly positioned lead apron or jewelry worn by the patient.

The image evaluator may also provide comments regarding the x-ray image 70 and/or indicate whether the power settings for the x-ray source 18 were set properly. When the image evaluator selects an option to indicate an issue by activating one of the buttons 74a-74i, a report associated with the x-ray image 70 is automatically populated with information associated with the selected option. The image evaluator may also add additional comments into the report. Thus, the application 62 determines what issues are associated with the x-ray image 70 based on input from the image evaluator.

In an alternative embodiment, the application 62 automatically evaluates the x-ray image 70 using image processing techniques to detect areas of the image 70 that are blurry, have a distorted size (such as might be indicated by anterior or posterior teeth that are larger than would be expected relative to other teeth), have image artifacts caused by foreign objects, and/or have a suboptimal exposure. Base on the detected image issues, the application 62 may use an algorithm to analyze the x-ray image 70 and determine whether there are any positioning issues, air passage issues, artifact issues, power issues, or other operator correctable issues. Based on these determinations, the application 62 then automatically populates a report with corresponding information advising the operator on what corrective action to take. Thus, in this alternative embodiment, the application 62 determines which issues are associated with the x-ray image 70 automatically without requiring input from the image evaluator.

Figure 5:
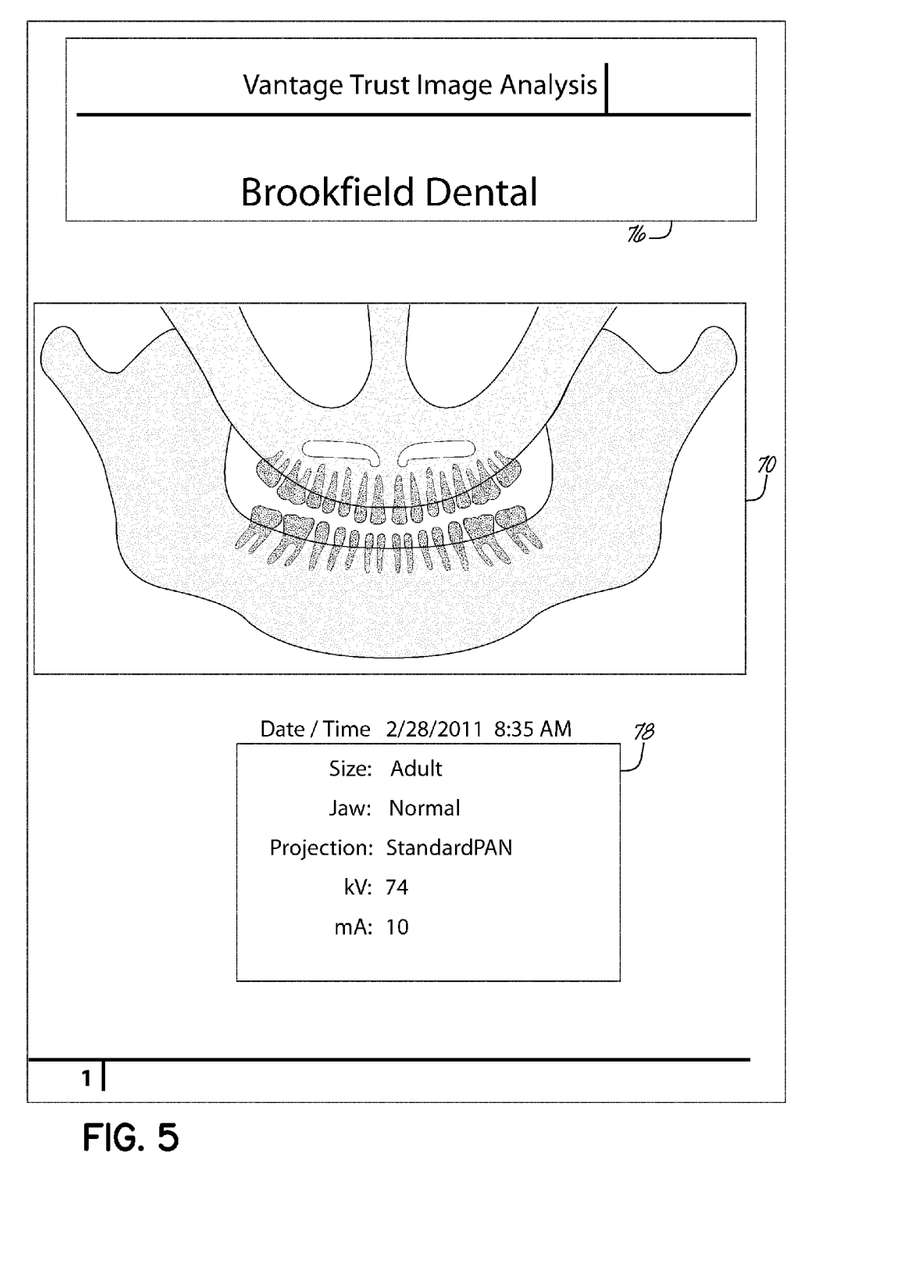
FIG. 5 illustrates a portion of an exemplary report generated by the image evaluation application.
Figure 6:
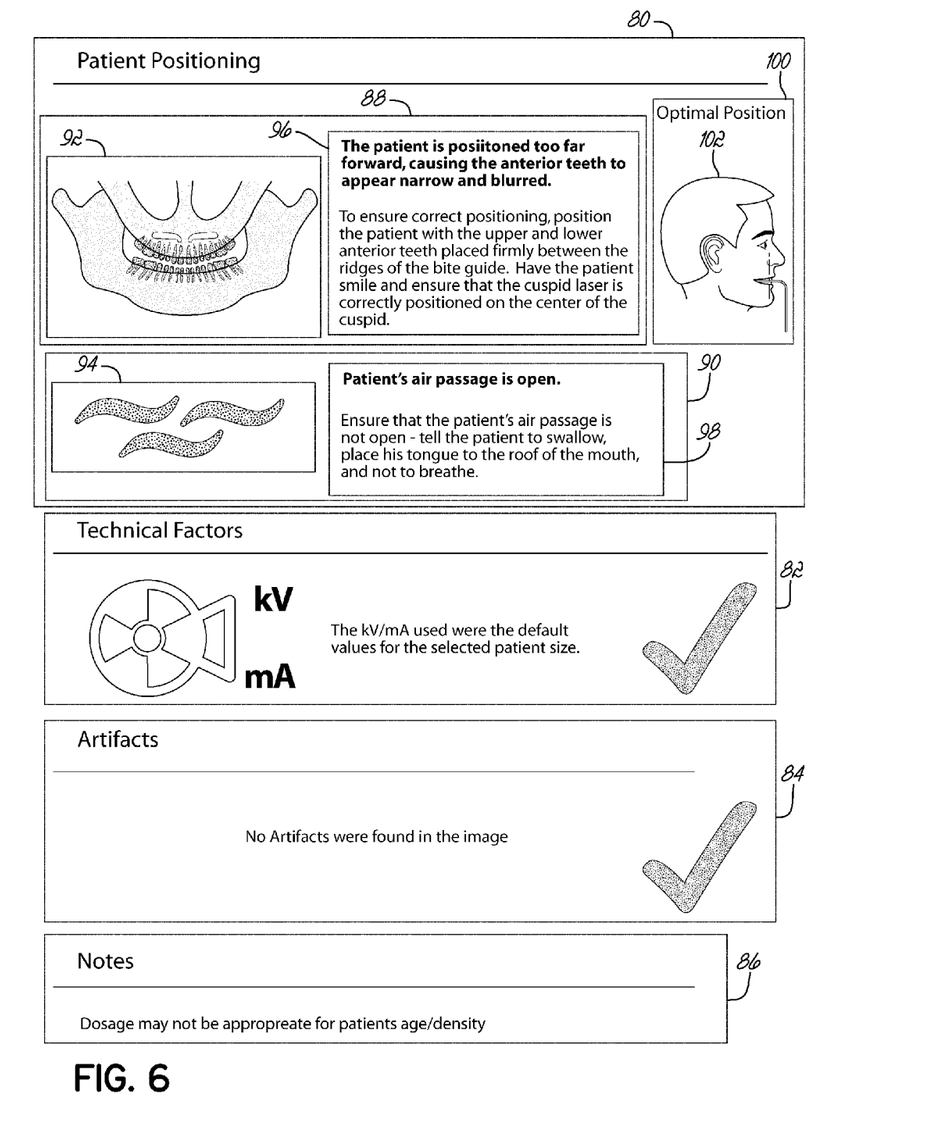
FIG. 6 illustrates another portion of the exemplary report generated by the image evaluation application.

Referring now to FIGS. 5 and 6, an exemplary generated report may include the x-ray image 70 and a list of issues associated therewith. For example, in addition to the image 70, the report may include a header 76, an image information section 78, a patient positioning section 80, a technique factors section 82 that includes information regarding the x-ray source settings such as current and voltage, an artifacts section 84 that includes information regarding any detected artifacts, and an image evaluator notes section 86 that includes any notes or comments entered by the image evaluator.

The header 76 may appear at the top of the report, and provides information regarding the source of the image 70, such as the name of the treatment facility where the image was taken. The image information section 78 may include information such as the date and time the image 70 was taken, the type of projection used, x-ray source settings, and details about the patient 26, such as age, size, and known dental features. The patient positioning section 80 may include observations 88, 90 that include image icons 92, 94 and text 96, 98 which indicates and/or describes positioning issues associated with the image 70. The patient positioning section 80 may also include a corrective action section 100 that provides an image 102 illustrating how to correct the patient's position. The generated report thereby includes information provided via the image issue reports generated by the application 62 as described above with respect to FIG. 4.

The generated report may be formatted as a document (e.g., in the .pdf format) and provided as hard copies or electronically, such as by e-mailing the file as an attachment or uploading the file in response to a user activating a button on a web page. The reports may also be provided on a website in a browser displayable format. When provided on a website, reports may be filtered such that a facility can only view reports associated with x-ray images that were taken at the facility. When provided on a website, individual portions of the report may be collected and provided in human perceptible form appropriately, as opposed to shown in the document format (e.g., at least a portion of the report may be formatted and presented using an extensible language, such as HTML, XML, or program code, such as JAVA, .NET, etc., instead of formatted and presented as a document). As such, the report, or portions thereof, may be stored or otherwise configured in a network browser readable format.

In addition to receiving and/or evaluating the x-ray image 70, the application 62 may also receive and evaluate information associated with the image capture device 12. This information may include service plan information (e.g., how many shots taken, days, weeks, months, years are left for the warranty of the image capture device 12), the number of shots taken by the image capture device 12, error codes generated by the image capture device 12, the voltage and current settings of the x-ray source 18 used to generate the x-ray image 70, and/or additional information regarding the image capture device 12. This information may also be evaluated by the application 62 to provide data related thereto in a report or separately to a facility. For example, if the warranty for a particular image capture device 12 is about to expire, the application 62 may indicate such in a report or a message (such as transmitted from the collector service 42 to the workstation 14 or, more simply, at the workstation 14 itself). Also for example, if the image capture device 12 indicates that it has had a particular error or a particular set of errors within a predetermined amount of time, the application 62 may indicate such in a report or a message.

In some embodiments, network congestion or interruption may prevent the x-ray image 70 from being immediately provided to the workstation 14 or the collector server 16. In those situations, the x-ray image 70 may be queued for transmission at the image capture device 12 or workstation 14, respectively. Similarly, data sent back to the image capture device 12 or workstation 14 may also be delayed. As such, the data may be queued for transmission at the workstation 14 or collector service 42, respectively.

Embodiments of the invention may provide a report regarding an x-ray image within a short period of time, or "in real-time" (e.g., the time required to automatically process and analyze the image, such as when an algorithm evaluates the x-ray image) or within a longer period of time (e.g., the time required to process and manually analyze the image, such as when the image evaluator evaluates the x-ray image).

As illustrated in FIGS. 1 and 2, the image capture device 12 is separate from the workstation 14 and/or collector service 42 that performs the evaluation of the x-ray image. However, in alternative embodiments, the image capture device 12 may be configured with the image evaluation application and thus perform the evaluation of the x-ray image therein. Those alternative embodiments of the invention offer a self-contained system that is capable of acquiring and evaluating x-ray images, as well as capable of providing the reports associated therewith.

The routines executed to implement the embodiments of the invention, whether implemented as part of an operating system or a specific application, component, program, object, module or sequence of instructions executed by one or more computing systems will be referred to herein as a "sequence of operations," a "program product," or, more simply, "program code." The program code typically comprises one or more instructions that are resident at various times in various memory and storage devices in a computing system, and that, when read and executed by one or more processors of the computing system, cause that computing system to perform the steps necessary to execute steps, elements, and/or blocks embodying the various aspects of the invention.

While the invention has been described in the context of fully functioning computing systems, those skilled in the art will appreciate that the various embodiments of the invention are capable of being distributed as a program product in a variety of forms, and that the invention applies equally regardless of the particular type of non-transitory computer readable signal bearing media used to actually carry out the distribution. Examples of non-transitory computer readable signal bearing media include, but are not limited to, physical and tangible recordable type media such as volatile and non-volatile memory devices, floppy and other removable disks, hard disk drives, optical disks (e.g., CD-ROM's, DVD's, etc.), among others.

In addition, various program code described herein may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. It should be further appreciated that the various features, applications, and devices disclosed herein may also be used alone or in any combination. Moreover, given the typically endless number of manners in which computer programs may be organized into routines, procedures, methods, modules, objects, and the like, as well as the various manners in which program functionality may be allocated among various software layers that are resident within a typical computing system (e.g., operating systems, libraries, APIs, applications, applets, etc.), and/or across one or more hardware platforms, it should be appreciated that the invention is not limited to the specific organization and allocation of program functionality described herein.

While the invention has been illustrated by a description of various embodiments, and while these embodiments have been described in considerable detail, it is not the intention of the applicant to restrict or in any way limit the scope of the appended claims to such detail. Additional advantages and modifications will readily appear to those skilled in the art. For example, although the present invention has been described with respect to a dental x-ray imager, those having skill in the art will recognize that computer applications described herein may also be used in the context of other medial imagers. Examples of medical imagers that may be used with embodiments of the invention include other types of tomography machines, e.g., Computerized Axial Tomography (CAT Scan) machines, as well as Magnetic Resonance Imaging (MRI) imagers, imagers using radioactive markers, gamma cameras, scintigraphy, Positron Emission Tomography (PET), and Ultrasound imagers, to name but a few. The invention in its broader aspects is therefore not limited to the specific details, representative methods, and illustrative examples shown and described. Accordingly, departures may be made from such details without departing from the spirit or scope of applicant's general inventive concept.

What is claimed is:

1. A method of providing feedback regarding an x-ray image, the method comprising:
   receiving an x-ray image from an imaging system, wherein the x-ray image is a panoramic dental image;
   determining whether the x-ray image includes a characteristic associated with an operator correctable issue; and
   generating a report related to the determination regarding the operator correctable issue;
   wherein the operator correctable issue is at least one of a patient head being tilted up, the patient head being tilted down, the patient head being turned left, the patient head being turned right, an image capture device being located anterior of the patient head, the image capture device being located posterior of the patient head, an air passage of the patient being open, an artifact being present in the x-ray image, a non-optimal x-ray source current setting, or a non-optimal x-ray source voltage setting.

2. The method of claim 1, further comprising:
   providing the report to an imaging system operator.

3. The method of claim 1, wherein the determination that the x-ray image includes a characteristic associated with an operator correctable issue is made in response to an input from an image evaluator.

4. The method of claim 3, wherein the report is generated automatically in response to the input from the image evaluator.

5. The method of claim 3, wherein the x-ray image is displayed to the image evaluator with a report generation pane, and the input from image evaluator is generated by the image evaluator activating a button on the report generation pane.

6. The method of claim 1, wherein the report includes information indicating how to correct the operator correctable issue.

7. The method of claim 1, further comprising:
   receiving, with the x-ray image, data relating to the imaging system.

8. The method of claim 7, further comprising;
   determining, from the data relating to the imaging system, whether an error has occurred with the imaging system; and
   notifying a user of the error if an error has occurred.

9. The method of claim 7, further comprising:
   determining, from the data relating to the imaging system, a time remaining on a service plan for the imaging system; and
   notifying a user of the time remaining on the service plan.

10. The method of claim 1, further comprising:
    determining whether the x-ray image can be presently transmitted over a network; and in response to determining that the x-ray image cannot be presently transmitted over the network, queuing the x-ray image for later transmission over the network.

11. A computing system, comprising:
a processing unit;
a memory; and
program code resident in the memory that, when executed by the processing unit, causes the computing system to:
receive an x-ray image from an imaging system, wherein the x-ray image is a panoramic dental image;
determine whether the x-ray image includes a characteristic associated with an operator correctable issue; and
generate a report related to the determination regarding the operator correctable issue;
wherein the operator correctable issue is at least one of a patient head being tilted up, the patient head being tilted down, the patient head being turned left, the patient head being turned right, an image capture device being located anterior of the patient head, the image capture device being located posterior of the patient head, an air passage of the patient being open, an artifact being present in the x-ray image, a non-optimal x-ray source current setting, or a non-optimal x-ray source voltage setting.

12. The computing system of claim 11, wherein the program code causes the computing system to determine whether the x-ray image includes a characteristic associated with an operator correctable issue in response to an input from an image evaluator.

13. The computing system of claim 12, wherein the program code causes the computing system to display the x-ray image with a report generation pane, and the input from the image evaluator is generated in response to activation of a button on the report generation pane.

14. The computing system of claim 11, wherein the report includes information indicating how to correct the operator correctable issue.

15. The computing system of claim 11, wherein the program code causes the computing system to receive, with the x-ray image, data relating to the imaging system.

16. The computing system of claim 15, wherein the program code causes the computing system to:

determine, from the data relating to the imaging system, whether an error has occurred with the imaging system; and
notify a user of the error if an error has occurred.

17. The computing system of claim 15, wherein the program code causes the computing system to:
determine, from the data relating to the imaging system, a time remaining on a service plan for the imaging system; and
notify a user of the time remaining on the service plan.

18. The computing system of claim 11, wherein the program code causes the computing system to:
determine whether the x-ray image can be presently transmitted over a network; and
queue the x-ray image for later transmission over the network in response to a determination that the x-ray image cannot be presently transmitted over the network.

19. A computer program product, comprising:
a non-transitory computer readable storage medium; and
program instructions stored on the computer readable storage medium, wherein the program instructions, when executed by a processing unit, cause the processing unit to:
receive an x-ray image from an imaging system, wherein the x-ray image is a panoramic dental image;
determine whether the x-ray image includes a characteristic associated with an operator correctable issue; and
generate a report related to the determination regarding the operator correctable issue;
wherein the operator correctable issue is at least one of a patient head being tilted up, the patient head being tilted down, the patient head being turned left, the patient head being turned right, an image capture device being located anterior of the patient head, the image capture device being located posterior of the patient head, an air passage of the patient being open, an artifact being present in the x-ray image, a non-optimal x-ray source current setting, or a non-optimal x-ray source voltage setting.

* * * * *